United States Patent
Gaudette

(10) Patent No.: US 6,705,205 B2
(45) Date of Patent: Mar. 16, 2004

(54) SPRING DAMPER APPARATUS

(75) Inventor: Michael S. Gaudette, Palmdale, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 99 days.

(21) Appl. No.: 09/954,254

(22) Filed: Sep. 18, 2001

(65) Prior Publication Data

US 2003/0051601 A1 Mar. 20, 2003

(51) Int. Cl.$^7$ .............................................. F01B 11/02
(52) U.S. Cl. ............................................... 92/85 A
(58) Field of Search ........................................ 92/85 A

(56) References Cited

U.S. PATENT DOCUMENTS 3,905,278 A  *  9/1975 Ourdouillie .................. 92/85 A

* cited by examiner

Primary Examiner—Edward K. Look
Assistant Examiner—Michael Leslie

(57) ABSTRACT

A piston apparatus includes a housing containing a piston, a first spring assembly arranged about a portion of the piston, a damping assembly including a hydraulic damper reset spring assembly arranged inside the piston, and cooperating structure on the housing and piston for actuating the damping assembly arranged inside the piston to slow motion of the piston when inside the housing. The housing includes a first end having a stop element with an axial stem portion. The spring assembly contains a spring captured between annular end members and is disposed between the exterior of the piston and the interior of the housing. The piston is supported for motion relative to the housing, and includes a hollow shaft having a first end extendable from the housing and bearing coupling means for attaching the piston to an object, a second end adapted for engagement with the axially extending stem portion, and a slotted portion disposed between the one end and the second end for communicating the interior of the hollow shaft with the interior of the housing.

16 Claims, 2 Drawing Sheets

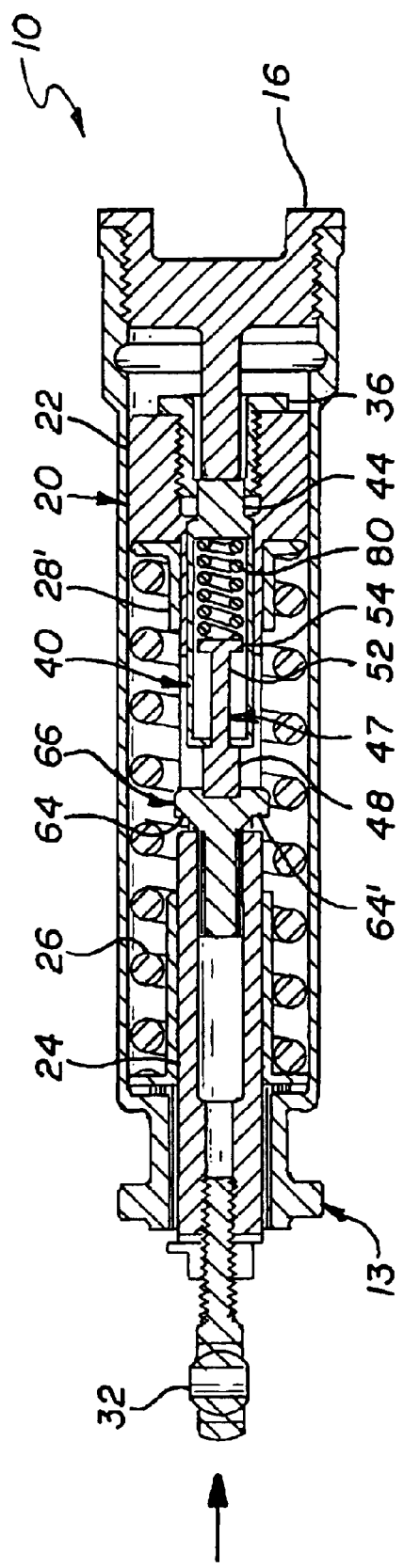
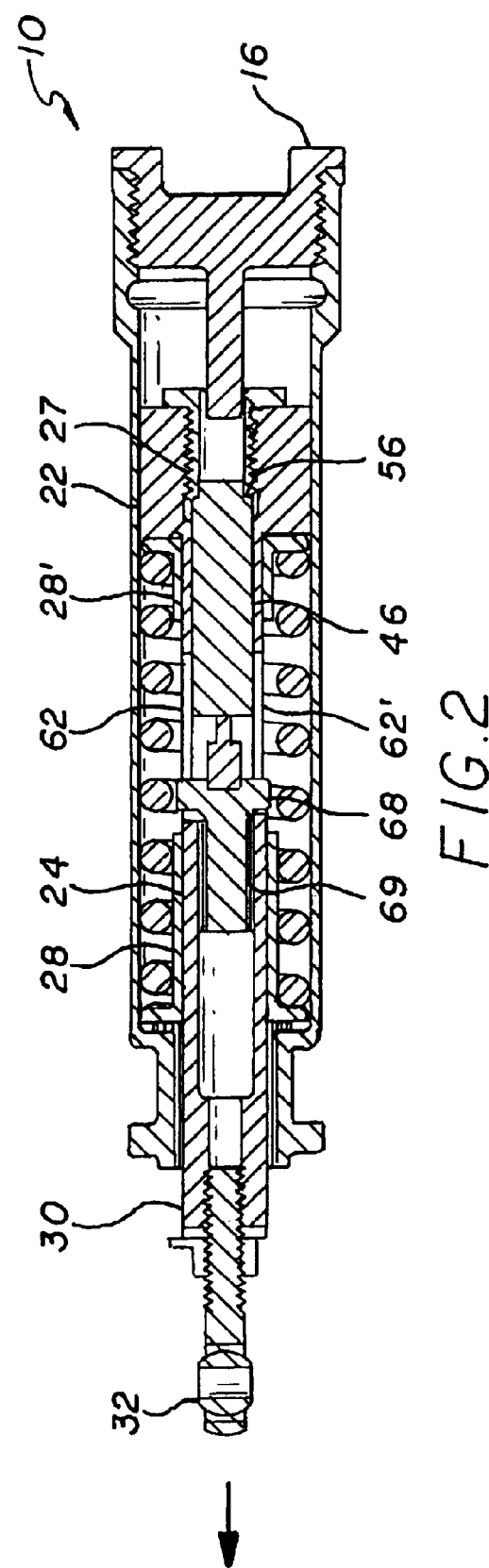
FIG. 1
FIG. 2

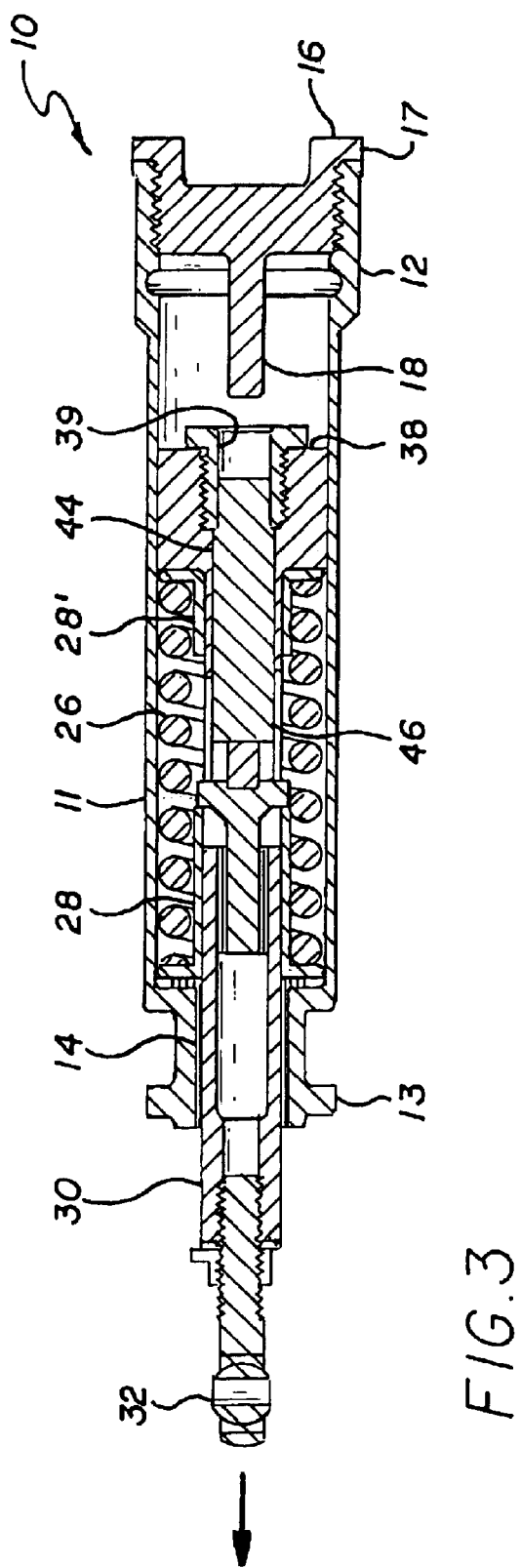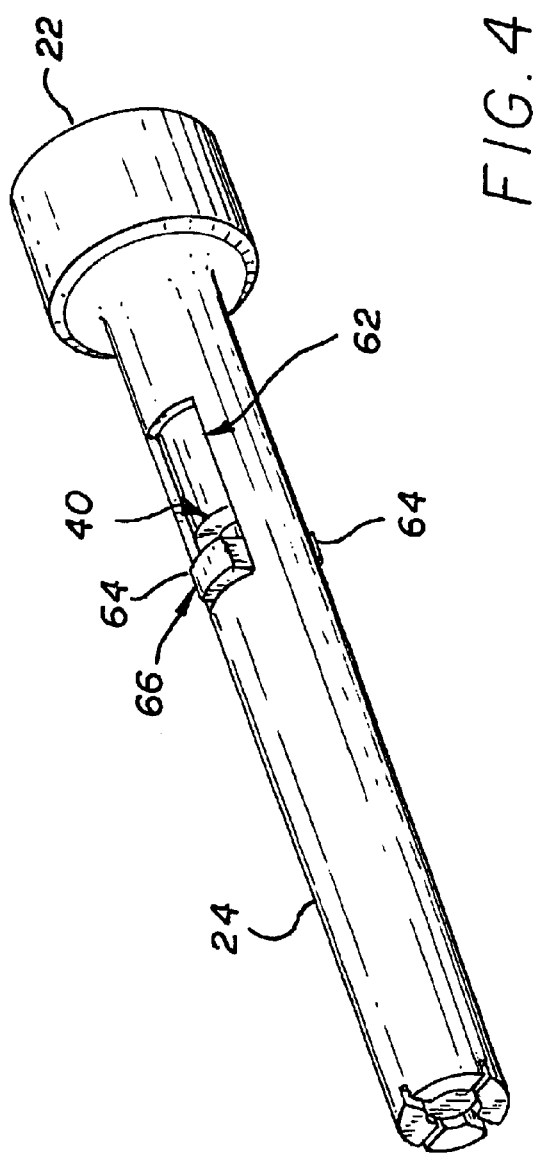

SPRING DAMPER APPARATUS

BACKGROUND OF THE INVENTION

1. Field of the Invention

The present invention relates to damping mechanisms, and more particularly to a piston damping mechanism providing damping effects at the end of compression and extension strokes of a piston, using one unidirectional damper unit.

2. Description of the Related Art

Among the many devices that find use in the aircraft industry are spring mechanisms facilitating the closing of doors and other such closures. Typically, the spring mechanisms comprise a highly loaded spring assembly. A closure using this type of spring mechanism generally will swing at high speed in an "opening" direction as well as a "closing" direction, and as a result high impact loads are incurred, which typically lead to early failure.

In order to diminish any possibility of damage, either to property or persons, spring mechanisms used as "door closers", to which such mechanisms are often referred and to which this invention relates, incorporate some form of damping mechanism, such as hydraulic dampers. Until recently, such "door closers" typically featured unidirectional damping capabilities, most with valve mechanisms to allow easy opening by overriding the damping when the door is opened, and by restorimg damping whenever the door is released for closing.

However, it has been found that such valve mechanisms can be eliminated without making the opening of a door unduly burdensome, by incorporating a two-way damping apparatus.

The prior art is replete with examples of two-way damping devices for use in the opening and closing of doors. For example, U.S. Pat. No. 4,917,222 to Bacardit and U.S. Pat. No. 5,170,530 to Kopec et al teach two types of two-way damping devices. The former (Bacardit) teaches a shock absorber in which two-way motion of the piston is slowed by an inertial valve which comes into play when the piston moves at a rate of acceleration that exceeds a certain predetermined value. The latter (Kopec et al.) teaches the use of a damper disposed in a cylinder located within the housing of a shock absorbing door closer apparatus, wherein the damper cooperates with incompressible hydraulic fluid contained in the cylinder to slow the motion of the piston in either of two oppositely directed motions.

Against this background of known technology, the applicant has developed a novel damping mechanism for slowing movement of a piston within a cylinder in either of an extension stroke or a compression stroke. The damping mechanism of the present invention is an improvement over existing off-the-shelf designs.

OBJECTS AND SUMMARY OF THE INVENTION

It is therefore an object of the present invention to provide a novel damping mechanism for slowing motion of a piston in a cylinder in either of the compression stroke or the extension stroke, while overcoming all the drawbacks and disadvantages of similar damping systems known in the art.

Another object of the present invention is to provide a piston and cylinder incorporating a damping apparatus that is constrained for reversible linear movement within the cylinder during extension and compression strokes of the piston, and which enables damping of the motion of the piston when the piston reaches a predetermined end region of the extension stroke or the compression stroke.

Other objects, advantages and features of the invention will become more apparent, as will equivalent structures which are intended to be covered herein, with the teaching of the principles of the invention in connection with the disclosure of the preferred embodiments thereof in the specification, claims and drawings in which:

BRIEF DESCRIPTION OF THE DRAWINGS

FIG. 1 depicts the piston and damping mechanism of the present invention in a first position in which the piston has been retracted into its housing;

FIG. 2 depicts the piston and damping mechanism of the present invention in a second position in which the piston is at rest, FIG. 3 depicts the piston and damping mechanism of the present invention in a third position in which the piston has been extended, and FIG. 4 shows a perspective view of the piston housing according to the teachings of the present invention.

DETAILED DESCRIPTION OF THE INVENTION

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein specifically to provide a damping mechanism for slowing motion of a piston in either of two linear directions of motion, using one bi-directional damper assembly.

Referring now to FIGS. 1–3 of the drawing, the piston assembly 10 of the present invention is seen to include a housing 11 having a first, internally threaded, inner end 12 adapted to be mounted in a support or other similar structure, and a second outer end 13 having a central bore in which a first bearing 14 is tightly secured, as for example, by press-fitting. An annular, externally threaded, end element 16 is threadedly mounted in and closes the inner end of the housing 11. The end element 16 includes an annular end flange 17 which abuts against an adjacent flange at the inner end of the cylindrical housing 11. The end element 16 further includes an axial extension 18 which extends axially outwardly toward the outer end 13 of the cylindrical housing 11 from a central portion thereof of the end element 16.

Positioned within the main housing 11 and extending axially thereof is a piston assembly 20 which includes an annular hollow piston end member 22 located at the inner end of the housing 11, an annular hollow piston shaft 24 extending axially from, and continuously with, the piston end member 22, and a main spring assembly including a main coil spring 26 and annular members 28, 28' against which the ends of the coil spring 26 abut. The main spring assembly is positioned about the piston shaft 24 and extends axially within the housing 11 between the inner and outer ends of the housing. The annular members 28, 28' include a radial segment against which a respective end of the coil spring 26 abuts, and an axial segment, the facing ends of the axial segments being spaced from one another a first predetermined distance.

A hollow damper nut 36 is secured within a bore 27 formed in the inner end of the hollow piston end member 22, with the head 38 of the damper nut 36 engaging the innermost face of the piston 22. The head of the damper nut is provided with a centrally located opening 39 which communicates with the bore 27 and which is of a diameter which snugly receives the axial extension of the end element 16 whenever the piston assembly 20 is moved inwardly of the main housing 11 (see FIGS. 1 and 2).

Secured in the forward or outer end 30 of the piston shaft 24 is a coupling member 32 having an axial extent for attachment to an element associated with the door (not shown).

Housed within the piston shaft 24 is a damper assembly 40 comprising a damper housing 46 having an inner seat portion 44, an axially extending shell portion having a slot formed in the outermost end thereof, a hydraulic damper and reset spring 80 disposed therein with the inner end of the reset spring 80 seated against outer face of the inner seat portion 44. A plunger assembly 47 includes an outer end 48 located outwardly of the damper housing 46, a shaft 52, and an inner end 54, the innermost surface of which seats against the outer end of the damper reset spring 80. The exterior surface of the seat portion 44 is formed with an annular shoulder 56, the purpose of which will be described below in connection with the operation of the apparatus of the present invention.

Referring now additionally to FIG. 4, the piston shaft 24 includes a pair of diametrically opposed slots 62, 62' (only one slot 62' is shown in FIG. 4, but the other slot 62 can be seen in FIGS. 1–3) from which radially extensive shoulder portions 64, 64' of an extension stop element 66 protrude. The shoulder portions 64, 64' of stop element 66 are integrally joined to a central head portion 68 which has a seat in the center thereof for receipt and engagement of the outer end 48 of the plunger assembly 47. The shoulder portions 64, 64' and central head portion 68 of the stop element 66 as shown in FIGS. 1–3 are integral with a body or stem portion 69 having a substantially smaller diameter than the diameter of the shoulder portions 64, 64', and is configured in that manner in order to be able to be lodged internally within the piston shaft 24.

Referring now again to FIGS. 1–3, in the apparatus shown, the piston shaft 24 will be coupled to a door assembly at end coupling 32, and upon opening and/or closing of the door assembly, will travel linearly in one direction or the opposite direction along the length of the main housing 11.

FIG. 1 illustrates the piston/damper assembly in a position within and relative to the main housing 11 in which the piston/damper assembly is in a retracted position. The piston shaft 24 assumes this "retracted" position whenever the door assembly (not shown), to which the piston shaft 24 is connected via the coupling 32 on the end of the piston shaft 24, reaches one of its extreme positions, i.e., either in a fully open position or in a fully closed positioned.

FIG. 2 shows the piston/damper assembly in an intermediate "at rest" position relative to the main housing 11. This situation occurs whenever the door assembly (not shown, but connected to the outer end of the piston shaft 24 via coupling 32) is neither fully opened or nor fully closed, and generally whenever there is no tension or compression force acting on the piston shaft 24.

FIG. 3 illustrates the piston/damper assembly in a position within and relative to the main housing 11 in which the piston/damper assembly is in a fully extended position. The piston shaft 24 assumes this "extended" position whenever the door assembly (not shown), to which the piston shaft 24 is connected via the coupling 32 on the end of the piston shaft 24, reaches an extreme position opposite from the position shown in FIG. 1.

In operation, starting from the position shown in FIG. 2, a force is applied to the piston assembly 20 via the coupling 32 (when a door assembly is moved in a first direction toward an opened or closed position) forcing the piston shaft 24 inwardly of the main housing 11 toward the end element 16. The piston shaft 24 travels freely to the right (as viewed in FIG. 2) within the main housing 11 until the inner surface (rightmost surface as viewed in FIG. 2) of the seat portion 44 of the damper assembly 40 engages the outer end (leftmost surface as viewed in FIG. 2) of the axial extension 18, at which time further travel of the piston shaft 24 to the right causes the outer end 48 of plunger assembly 47 to be forced toward and into the damper housing 46 such that the inner end 54 of the plunger assembly 47 is forced into engagement with the outer end of the reset spring 80. This movement is then damped by the damper assembly 40, contained within the damper housing 46, which is compressed and exerts a counter reaction or force on the plunger assembly 47. Further motion of the piston shaft 24 into the housing 11 is opposed until the door contacts its external stops.

When the door assembly attached to the coupling 32 is moved in the reversed opposite outward direction (i.e., toward the left), the plunger assembly 47 of the piston and damper assembly is initially assisted in its outwardly directed movement from the damper housing 46 by the damper reset spring 80, and urges the abutting stop element 66, located in front of the outer surface 46 of the plunger assembly 47 into contact with the outward edge of the slot 62 and 62' located in the piston shaft 24 and assists engagement of shoulder 56 on damper housing 46 (inward direction) with the outer end face of the annular damper nut 36. As the piston shaft 24 moves past the position shown in FIG. 2, and further out of the main housing 11 in an outward direction (i.e., toward the left), the shoulder portion 64 and 64' of stop element 66 moves into abutting relationship with the inward edge of the axial segment of the annular member 28, at which time further travel of piston shaft 24 to the left causes stop element 66 to remain stationary in slot 62, 62'. Continued movement of piston shaft 24 to the left causes plunger assembly 47 to be forced into damper housing 46, whereupon the inner end 54 of plunger assembly 47 once again makes contact with the outward end of the damper reset spring 80. This movement is then dampered by the damper assembly 40, contained within the damper housing 46, which is compressed and exerts a counter reaction or force on the plunger assembly 47. Further motion of the piston shaft 24 into the housing 11 is opposed until the door contacts its external stops.

Those skilled in the art will appreciate that various adoptions and modifications of the invention as described above can be configured without departing from the scope and spirit of the invention. Therefore, it is to be understood that, within the scope of the appended claims, the invention may be practiced other than as specifically described herein.

What I claim is:

1. A piston damping apparatus, comprising:
    a housing including a first inner end for attachment to a support and a second outer end, said housing including a piston and an annular spring assembly disposed about said piston, said housing inner end including an end element fixed thereto and including an axial extension,
    said spring assembly including a spring captured between annular end members located in said housing and arranged between the exterior of said piston and the interior of said housing;

said piston being supported for reversible motion relative to said housing, and including a hollow piston shaft having a first end extendable from said housing and bearing coupling means for attaching said piston to an object, a second end adapted for engagement with said axial extension, and a slotted portion disposed between said first end and said second end for communicating the interior of said hollow piston shaft with the interior of said housing;

a damping assembly within a damper housing and including a spring and a plunger mechanism normally biased outwardly by said spring for damping said linear motion of said piston within said damper housing in either direction of said piston motion, said damping assembly further including a seat portion located outside said damper housing in facing relationship to, and adapted for, engaging said axial extension to initiate slowing of movement of said piston shaft into said housing when said piston shaft engages said axial extension, and an outer end of said plunger mechanism for engaging a stop element to initiate slowing of said piston shaft in said housing when said piston shaft moves away from said axial extension.

2. The piston damping apparatus of claim 1, wherein the outer end of said plunger mechanism is located outwardly of the stop element.

3. The piston damping apparatus of claim 1, wherein said plunger mechanism comprises a shaft bearing an inner head and an outer head, said inner head being in engagement with said damper spring and said outer head being in engagement with said stop element.

4. The piston damping apparatus of claim 3, wherein said damper housing is disposed entirely within said piston shaft, said damper housing having a slot at its outward end for receiving the shaft of said plunger mechanism.

5. The piston damping apparatus of claim 4, wherein said inner head of said plunger mechanism is disposed within said damper housing and said outer head of said plunger mechanism is disposed outside of said damper housing.

6. The piston damping apparatus of claim 1, wherein said slots in said piston shaft are diametrically opposed to one another.

7. A damping mechanism for a piston moving within a housing, comprising:

a container including a spring, a plunger element comprising a shaft having opposing heads, a first one of said heads being located entirely within said container and the second of said heads being located entirely outside of said container, said container being slidably supported within said piston for movement along the axis of said piston, and a stop element having a stem slidably supported within said piston for movement along the axis of said piston forwardly of said container, said stop element including radially projecting shoulders, said stop element being positioned forwardly of said second head such that said shoulders engage a slotted portion of said piston designed for preventing further motion of said stop element, and the second of said heads is configured to engage said stop element to initiate slowing of said piston in said housing.

8. A piston arrangement, comprising:

a housing, a piston supported for motion in said housing, and a bi-directional motion damping mechanism carried by the piston and having surfaces on elements carried within said piston that are engagable with the housing to initiate motion damping of the piston within the housing when the piston is either extending from the housing or retracting into the housing, wherein the motion damping mechanism includes a damping assembly including a spring and a plunger mechanism for damping said motion of said piston.

9. The piston arrangement of claim 8, further comprising:

an outer head of said plunger mechanism configured to engage a stop element to initiate slowing of said piston shaft in said housing.

10. The piston arrangement of claim 9, wherein said plunger mechanism comprises a shaft bearing an inner head and said outer head, said inner head being configured to engage said damper spring.

11. The piston arrangement of claim 8, further comprising:

a damper housing for the motion damping mechanism, wherein the damper housing includes a slot at its outward end for receiving the shaft of said plunger mechanism.

12. The piston arrangement of claim 11, wherein said inner head of said plunger mechanism is disposed within said damper housing and said outer head of said plunger mechanism is disposed outside of said damper housing.

13. The piston arrangement of claim 8, further comprising an end coupling mounted to the piston, wherein the end coupling is attachable to a device movable between a first position end a second position by operation of the piston.

14. A piston apparatus, comprising:

a housing;

a piston movably positioned in the housing;

a damper assembly positioned within housing, and including a spring and a plunger element, wherein the plunger element includes a shaft having opposing heads being slidably supported for movement along the axis of the piston, and a stop element slidably supported for movement along the axis of the piston, said stop element including a shoulder and being positioned forwardly of one head of the plunger element such that the shoulder engages an annular member positioned proximate the piston, wherein the annular member is attached to the housing and is configured to prevent motion of the stop element beyond a particular point in one direction.

15. The piston apparatus of claim 14, further comprising:

an axial extension attached to the housing in spaced apart relation to the annular member, wherein the axial extension is configured to prevent motion of the stop element past a specified point in another direction.

16. The piston apparatus of claim 14, further comprising an end coupling mounted to the piston, wherein the end coupling is attachable to a device movable between a first position and a second position by operation of the piston apparatus.

* * * * *